United States Patent

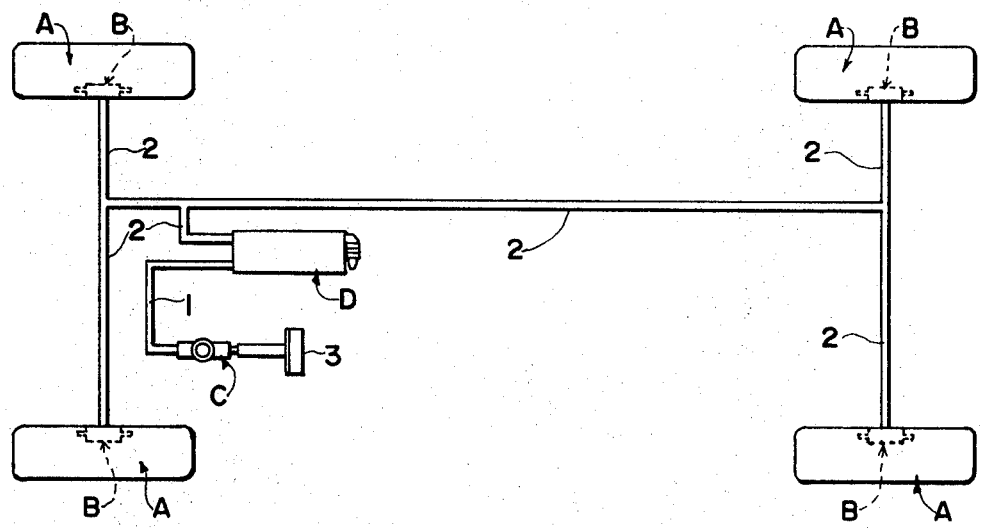
Fig-1
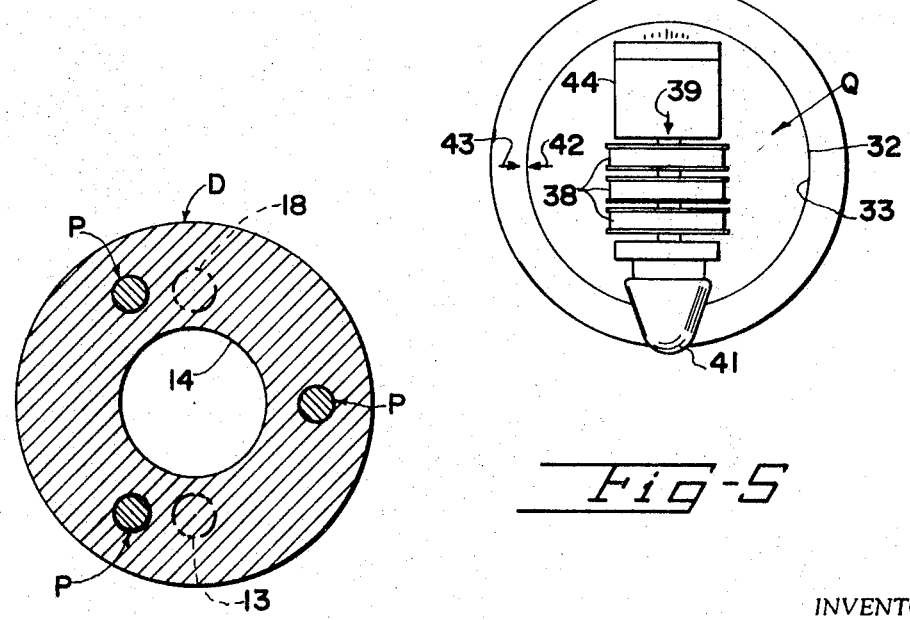
Fig-4
Fig-5
INVENTOR.
JOHN G. WRIGLEY
BY DENNIS PORTCH
William R. Piper
ATTORNEY

[11] 3,617,100

| [72] | Inventors | John G. Wrigley<br>2495 Prosperity Way,<br>San Leandro, Calif. 94578;<br>Dennis Portch,<br>Hayward, Calif. 94578 |
|---|---|---|
| [21] | Appl. No. | 38,159 |
| [22] | Filed | May 18, 1970 |
| [45] | Patented | Nov. 2, 1971 |

[54] ANTI-THEFT BRAKE MONITORING DEVICE FOR VEHICLES
8 Claims, 5 Drawing Figs.

[52] U.S. Cl. .................................................. 303/89,
60/54.5 E, 137/598, 192/3 H, 188/353
[51] Int. Cl. ........................................................ B60r 25/08
[50] Field of Search .......................................... 188/353;
303/89; 192/3 H; 60/54.5 E, 54.6 E; 137/598

[56] References Cited
UNITED STATES PATENTS

| 2,572,190 | 10/1951 | Patrick .......................... | 188/353 X |
| 2,964,141 | 12/1960 | Schlumbrecht .............. | 188/353 |
| 3,116,752 | 1/1964 | Duncan ......................... | 188/353 |
| 3,497,265 | 2/1970 | Vandermark ................. | 303/89 X |

Primary Examiner—George E. A. Halvosa
Attorney—William R. Piper

ABSTRACT: An antitheft brake monitoring device for vehicles which is mounted in the instrument panel of a vehicle and is connected into the brake fluid line that extends from the master cylinder, or power brake booster, to the brake wheel cylinders. The device can be controlled by a combination locking device for holding an applied brake action on all of the vehicle wheels indefinitely during the absence of an authorized vehicle operator. The device can automatically compensate for volume contraction of the fluid in the brake lines due to temperature change or loss of fluid.

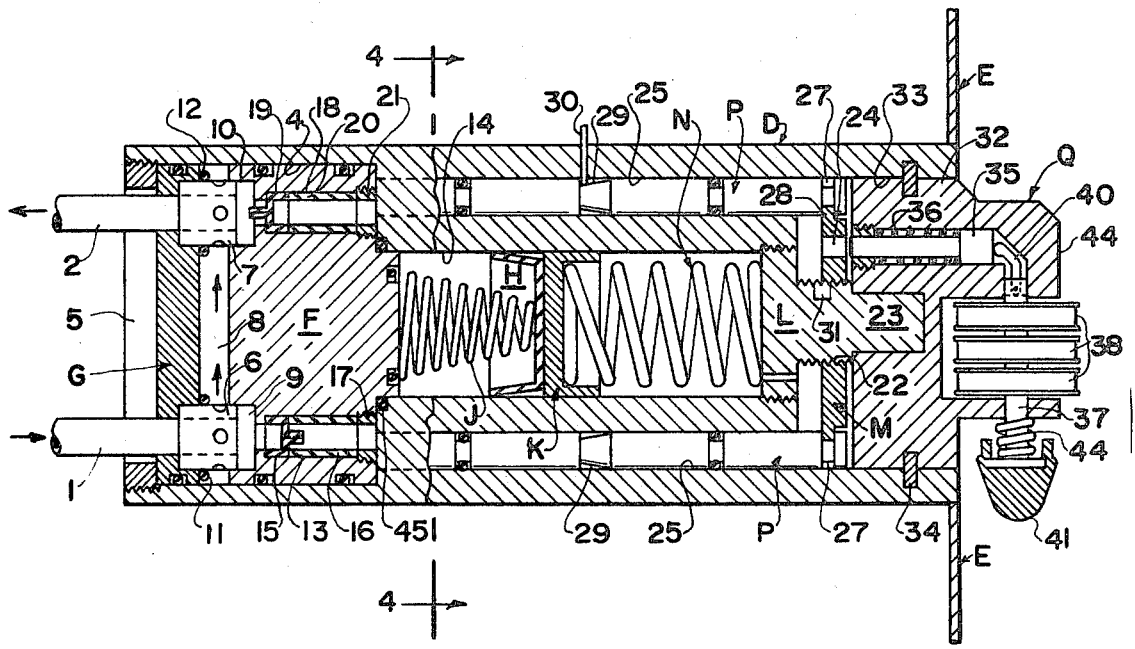

INVENTOR.
JOHN G. WRIGLEY
BY DENNIS PORTCH

William R. Piper
ATTORNEY

ANTI-THEFT BRAKE MONITORING DEVICE FOR VEHICLES

BACKGROUND OF THE INVENTION

1. Field of the Invention

Our device is designed to be used primarily in conjunction with the type of hydraulic braking systems most commonly used in the automobile and light trucks which use hydraulic fluid as the means of transferring braking power from a master cylinder to the brake cylinders associated with the vehicle wheels. The device could be used on aircraft where a similar type of hydraulic braking action is used for the landing wheels.

2. Description of the Prior Art

The patent to Robert C. Evans, U.S. Pat. No. 3,298,417, on a Valve for Hydraulic Brake Holding System and the patent to Jean-Louis Gavillet, U.S. Pat. No. 3,303,910, on an Anti Theft Arrangement for Power-Driven Vehicles, both shown valves in the hydraulic fluid brake line which may be closed for preventing the releasing of fluid from the brake cylinders. Neither patent shows automatic means for delivering additional fluid into the hydraulic lines leading to the brake cylinders to compensate for volume contraction of the fluid due to temperature change or fluid loss.

SUMMARY OF THE INVENTION

An object of our invention is to provide an anti theft brake monitoring device for vehicles which when not in use, permits the hydraulic brake system to function in the normal manner. When the device is used for applying the brakes on the vehicle, a valve is closed which will prevent the release of the hydraulic brake fluid from the brake cylinders. Even after the brakes have been set, it is still possible to automatically feed additional fluid into the lines leading to the brake cylinders to overcome any depletion of fluid due to temperature or fluid loss. Although we show the device as being applied to the hydraulic brake system of a vehicle, it could also be used on aircraft in which a similar type of hydraulic braking system is used.

Our device can be incorporated in any double acting hydraulic system used in the operation of equipment and machinery, such as: construction equipment, fork lifts, elevators, hydraulic doors, etc., with the deletion of the brake monitoring system.

BRIEF DESCRIPTION OF THE DRAWINGS

FIG. 1 is a diagrammatic plan view of the hydraulic braking system in a vehicle and illustrates our device coupled into it.

FIG. 4 is a transverse section through the device and is taken substantially along the line 4—4 of FIG. 2.

FIG. 5 is an end view of the device when looking at the right-hand end of FIG. 2.

In carrying out our invention, we show in FIG. 1, one form of application to the hydraulic brake system for a vehicle. The four wheels of the vehicle are indicated generally at A, and the brake cylinders for the wheels are shown at B. A brake master cylinder is indicated at C, and normally a hydraulic line 1, extends from the master cylinder to the brake cylinders B, associated with the brakes for the four vehicle wheels A. We connect our device in the hydraulic line 1, and hydraulic line 2 extends from our device, indicated generally at D, in FIGS. 1, 2 and 3, and branches to the four brake cylinders B, for the four wheels. When our device is in inoperative position, as shown in FIG. 2, the brake fluid will flow unimpeded through the lines 1 and 2 to apply the brakes when a brake pedal 3, see FIG. 1, is manually depressed. We call the line 1, a first pipe and the line 2, we call a second pipe.

Figure 2:
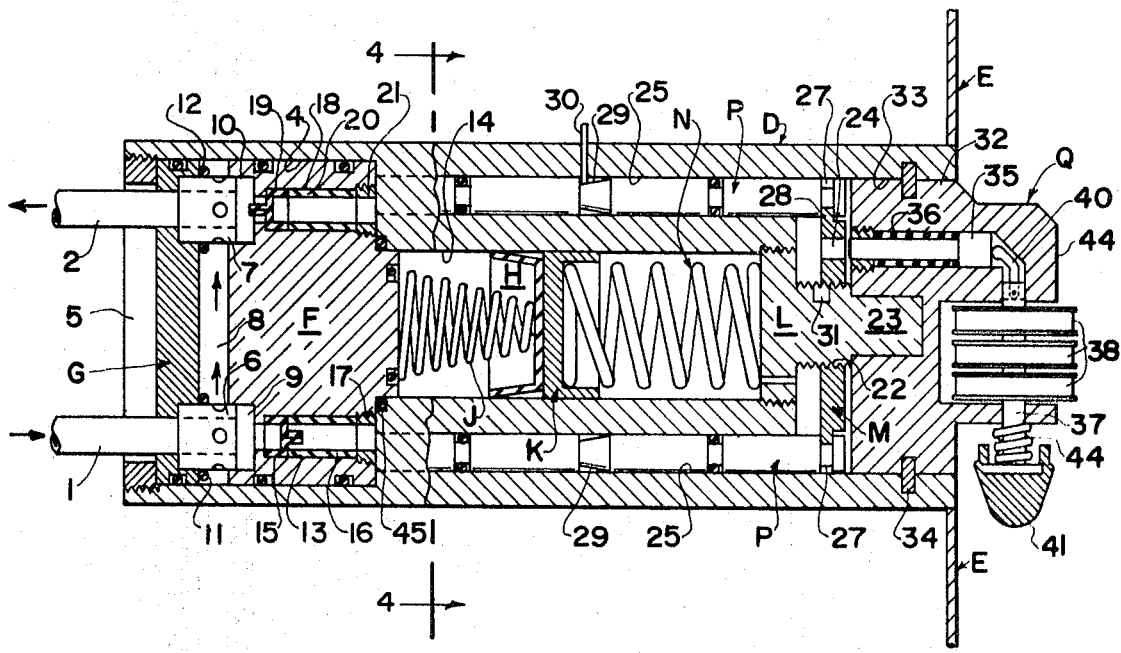
FIG. 2 is a longitudinal section through the device when in inoperative position and illustrates two of the three valve body actuating rods although only three actuating rods are used and these are angularly spaced 120° from each other and therefore a true longitudinal section taken along the longitudinal axis of the device should correctly show only one of the actuating rods. Two of the actuating rods are illustrated in FIG. 2 for purposes of clarity.

It is best now to describe in detail the structure of our anti theft brake monitoring device as shown in FIGS. 2 to 5 inclusive. A cylindrical casing D, is designed to be supported in any manner desired in the instrument panel E of the vehicle so that preferably only one end of the device will be viewable and this end will carry the combination lock which will be described later. The casing D has a large cylindrical bore 4 for slidably receiving a valve body F. The length of the bore 4 is greater than the length of the valve body F, and an inlet and an outlet port plate G, is placed to the left of the valve body and is spaced therefrom when the valve body is in inoperative position, as illustrated in FIG. 2. A ring nut 5 is threaded into the left-hand end of the casing D, for closing it and the ends of the hydraulic lines 1 and 2 extend through openings in the port plate G and communicate with O-ring carrier tubes 6 and 7 respectively. The tubes have transversely extending openings that register with a fluid displacement passage formed between the port plate G, and the valve body F, when the latter is in inoperative position. Arrows shown in FIG. 2 illustrate how the hydraulic fluid is free to flow through the line 1, the tube 6, the displacement passage 8 in the casing D, the tube 7, and thence through the line 2 to the wheel brake cylinders B, in FIG. 1, when the brake pedal 3 is depressed. The reverse fluid flow is true when the brake pedal 3 is released.

Figure 3:
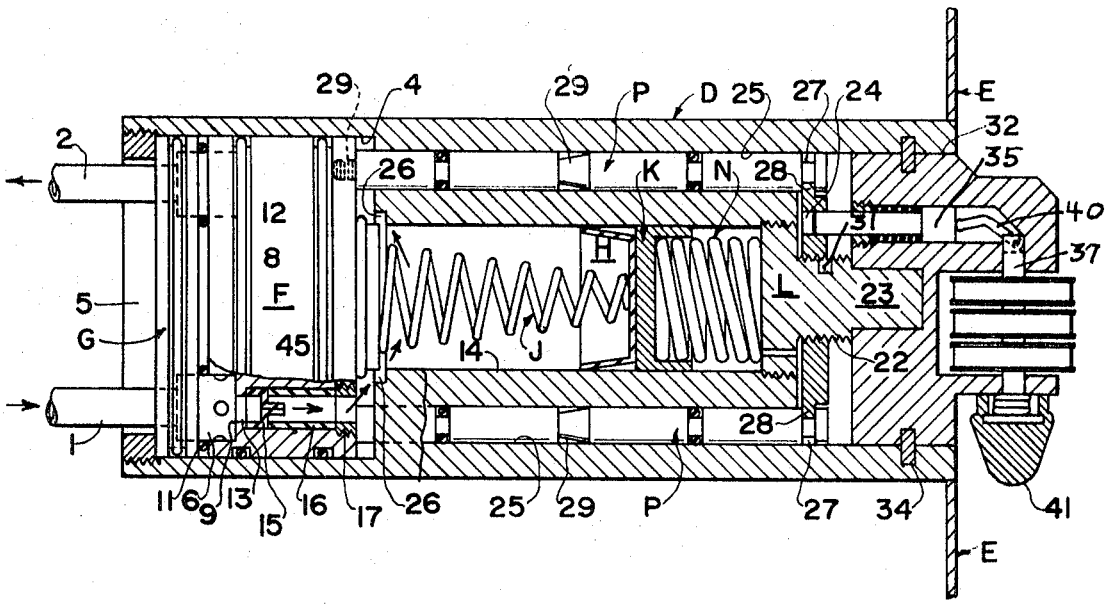
FIG. 3 is a longitudinal section similar to FIG. 2 and shows the device in operative position for locking the vehicle brakes. Again two of the three actuating rods are shown.

The O-ring carrier tubes 6 and 7 have their outer ends extending into the fluid displacement space when the valve body F, is in inoperative position, as shown in FIG. 2, and is spaced away from the inlet and outlet port plate G. Also, the left-hand end of the valve body F has two recesses 9 and 10 which are adapted to receive the free ends of the O-ring carrier tubes 6 and 7, respectively, when the valve body is moved to the left, as shown in FIG. 3. The recesses 9 and 10 will close the transverse openings in the tubes 6 and 7 when the valve body is moved into its operative position as indicated in FIG. 3. We indicate the tube 6 as a first means for placing the first pipe 1 in communication with the first valve body passage 13 and we indicate the tube 7 as a second means for placing the second pipe 2 in communication with the second passage 18 in the valve body F. We mount O-rings 11 and 12 around the portions of the tubes 6 and 7 that project to the right of the plate G, see FIGS. 2 and 3. Then when the valve body F is moved to the left from the inoperative position shown in FIG. 2, into the operative position as shown in FIG. 3, the recesses 9 and 10 will receive the protruding portions of the tubes 6 and 7, respectively, and will permit the valve body to bear against the O-rings 11 and 12 and force them against the adjacent wall of the plate G to make a liquid tight seal. The recesses 9 and 10 will have their cylindrical walls enclose the transverse openings in the tubes 6 and 7 and this plus the liquid tight seal applied by the valve body F against the O-rings 11 and 12, will prevent any flow of hydraulic fluid from the line 1, through the fluid displacement space 8 and into the line 2 and will also prevent any reverse flow from the pipe or line 2 back into the line 1.

Before describing the reason for moving the valve body F from the inoperative position shown in FIG. 2 into the operative position shown in FIG. 3, it is best to describe in detail the structure that effects such movement. The recess or cavity 9 in the valve body F that receives the tube 6 has a hydraulic fluid conveying first passage 13 which extends through the remainder of the valve body and communicates with a brake monitoring cylindrical bore 14 that is smaller in diameter than the large bore 4 that receives the valve body F, but whose axis coincides with the axis of the bore 4. Within the passage 13 we place a nonreturn valve 15 that will permit hydraulic fluid to flow in only one direction in the passage and that is from the recess 9 and into the bore 14, but will prevent any return flow. A Nylon spacing sleeve 16 is placed in the passage 13 and has one end contacting the check valve 15. A threaded retainer ring 17 is mounted in the threaded portion of the passage 13 and holds the sleeve 16 and check valve 15 in place. When the valve body F is in operative position, as shown in FIG. 3, hydraulic fluid can flow from the pipe 1, through the tube 6, past the nonreturn or check valve 15, through the sleeve 16 and threaded retaining ring 17 and into the bore 14 as indicated by the arrows in FIG. 3. We call the bore 4, a first bore and the bore 14 we call a second bore.

Referring to FIG. 2, we show the recess 10 in the valve body F communicating with a hydraulic fluid second passage 18 that is similar to the passage 13, excepting that a nonreturn or check valve 19 is facing in the opposite direction from the check valve 15 and only permits the hydraulic fluid to flow from the brake monitoring cylindrical bore 14 when the valve body is in operative position shown in FIG. 3. A Nylon spacing sleeve 20 is placed in the passage 18 and one end contacting the check valve 19. A threaded retainer ring 21 is mounted in the threaded portion of the passage 18. When the valve body F, is in operative position as shown in FIG. 3, hydraulic fluid can flow from the brake monitoring cylindrical bore 14 through the passage provided by the threaded ring 21 and sleeve 20, past the nonreturn or check valve 19, and thence through the tube 10 and into the pipe or hydraulic line 2.

We provide yielding means in the brake monitoring cylindrical bore 14 for forcing hydraulic fluid from the bore 14 and into the line 2 to automatically feed fluid to the brake cylinders B, after the brakes have been applied and the valve body F, is in operative position as shown in FIG. 3. The purpose of this is to compensate for volume contraction due to temperature change or fluid loss. Should fluid loss be excessive the operator will then be warned that brake service is necessary. In both FIGS. 2 and 3, we show a piston cup H, slidably mounted in the bore 14 and a retainer coil spring J, is mounted between the piston cup H, and the adjacent end of the valve body F. The piston cup H, is held against a piston K by the spring J, and the piston is also slidably mounted in the same bore 14. The right-hand end of the bore 14 is closed by a plug L which has a threaded portion received in the internally threaded part of the bore.

The plug L also has a reduced threaded portion 22 and a cylindrical end 23 that extends to the right of the threaded portion 22, see FIGS. 2 and 3. We mount a drive nut M, on the threaded portion 22 of the plug L, and the drive nut has one or more openings 24 that are angularly arranged to each other and are spaced the same distance from the central axis of the plug L, which axis coincides with the central axis of the casing D. The threaded portion 22 can be regarded as a stationary member with respect to the casing D. The purpose for providing the one or more openings 24 in the drive nut L, will be explained shortly. A coil spring N, is mounted between the inner surface of the plug L and the piston K, and this spring is considerably heavier than the coil spring J. The spring N exerts a continuous yielding pressure on the piston K for urging it to the left in FIG. 3 for forcing hydraulic fluid from the bore 14 in the casing D, into the passage 18 in the valve body F, and past the check valve 19, the fluid then entering the tube 7, and pipe 1 and flowing to the brake cylinders B, for maintaining a braking action on all of the vehicle wheels A.

We provide novel connecting means between the drive nut M, and the valve body F so that a rotation of the nut in a clockwise direction will move the valve body longitudinally in the bore 4 in the casing D from the inoperative position shown in FIG. 2, into operative position shown in FIG. 3, and vice versa. A plurality of rods P are slidably mounted in small diameter bores 25 that are angularly disposed with respect to each other and are spaced radially from the axis of the casing D so as to lie beyond the inner surface of the bore 14, but the left-hand end of the bores 25 open into the larger diameter bore 4 at the shoulder 26 formed at the juncture of the bore 4 with the bore 14, see FIG. 3. We have shown three rods P, each being spaced 120° from the adjacent rods.

It will be noted from FIGS. 2 and 3, that the rods P, are provided with annular grooves 27 and that the drive nut M has an outwardly extending annular flange 28 that extends into the grooves 27. The left hand ends of the rods P, have reduced threaded portion 29, see FIG. 3, that are received in threaded recesses in the valve body F. The result is that there is a positive connection between the drive nut M, and the valve body F, and that the valve body can be shifted longitudinally from the inoperative position shown in FIG. 2 to the operative position shown in FIG. 3, by merely rotating the drive nut in a clockwise direction. The rods P, are provided with additional annular grooves and these receive O-rings for sealing the bores 25 and preventing any fluid passing therethrough. Both FIGS. 2 and 3, illustrate the rods P, as having annular grooves 29 with tapered inner walls. The casing D may have radially extending members 30, see FIG. 2, that are slidably received in radially extending slots with the inner ends of the members 30, contacting the tapered inner wall in the annular grooves 29. When the rods P, are shifted longitudinally, the tapered inner walls of the annular grooves 29 in the rods will move the radially extending members in the direction of their lengths and this movement may be utilized to actuate electrical interlock switches, not shown.

FIG. 4 shows the three rods P, angularly spaced 120° apart and further shows by dot dash circles 13 and 18, spaced diametrically apart, how these hydraulic fluid passages are positioned so as not to interfere with the attachment of the left-hand threaded ends 29, of the rods to the valve body F, see FIG. 3. Both of the longitudinal sections of FIGS. 2 and 3 are taken so as to show two of the three rods P, in elevation for the purpose of clarity. The two fluid passages 13 and 18 are shown in section in FIG. 2 so as to illustrate the nonreturn or check valves 15 and 19 and their associate parts in section. The check valve 15 will open when the fluid flows from left to right in the passage 13, but will close and prevent any counterflow through this passage. In like manner the check valve 19 will open when the fluid flows from right to left in the passage 19, but will close to prevent any counterflow through the same passage. Both FIGS. 2 and 3 shows the disc-shaped inlet and outlet port plate G provided with an O-ring for sealing purposes. Also the valve body F has O-rings for sealing against fluid leakage. The threaded portion 22 of the plug L, see FIG. 2, has a pellet 31 that frictionally bears against the adjacent surface of the drive nut M for holding the nut in the position into which it has been rotated.

We will now describe one form of lock that may be used for permitting an authorized person to rotate the drive nut M for moving the vaLve body F from inoperative position shown in FIG. 2, into operative position as shown in FIG. 3. A key lock could be used but we show a combination lock rather than a key controlled lock. A body lock assembly is indicated generally at Q in FIGS. 2, 3 and 5. The assembly includes a rotatable member that has a cylindrical outer wall 32 that is rotatably received in a cylindrical bore 33 in the right hand end of the casing D. A retaining ring 34 is received in complemental annular grooves in the cylindrical portion 32 of the body lock assembly Q, and in the adjacent inner surface of the cylindrical bore 33 in the casing D. This retaining ring 34 prevents any longitudinal movement of the cylindrical portion 32 in the bore 33 while permitting the body lock assembly to rotate with respect to the casing D.

The cylindrical portion 32 of the body lock assembly Q carries a drive pin 35, see FIGS. 2 and 3, whose axis is aligned with the opening 24 in the drive nut M, the axis paralleling the central axis of the casing D. The pin 35 has a head at its right-hand end and a coil spring 36 yieldingly holds the pin out of contact with the drive nut M. A lock pin 37 extends at right angles to the drive pin 35 and the lock pin carries a plurality of combination dials 38 and FIG. 5 shows these dials provided with numbers from "0" to "9" inclusive. The dials 38 form a combination lock and the right combination of numbers on the three dials must be aligned with an arrow 39 before the lock pin 37 can be depressed in the direction of its axis so as to actuate a fulcrum cam 40 and move the drive pin 35 into a registering opening 24 in the drive nut M. The lock pin 37 is provided with a stop and release unit 41, see FIGS. 2 and 3, which when depressed will move the lock pin for causing the drive pin 35 to enter the opening 24 in the drive nut M, providing the correct combination has been achieved on the dials 38. The arrow 42 adjacent to the periphery on the body Q, see FIG. 5, when aligned with an arrow 43 placed at the end of the casing D, indicates that the drive pin 35 registers with the opening 24 in the drive nut M. The portion 44 of the body Q, see FIG. 5, now acts as a handle and the handle can be rotated in a clockwise direction for rotating the drive nut M in the same direction and causing the nut to move the rods P, in a longitudinal direction to the left in FIG. 2 for moving the valve body F from inoperative position in this Figure, into operative position as shown in FIG. 3. When the stop and release unit 41 is again depressed and released, a spring 44 will retract the lock pin 37 and permit the spring 36 to remove the drive pin 35 from the opening 24 in the drive nut M. The combination dials 38 are rotated to cancel the correct combination of digits on the dials and the handle 44 may now rotate the body lock assembly Q without having any effect on the drive nut M.

OPERATION

From the foregoing description of the various parts of the device, the operation thereof may be readily understood. During the normal service braking action, the operating parts of our device are as illustrated in FIG. 2 with the valve body F, in inoperative position. The driver of the vehicle when applying the brakes, depresses the brake pedal 3 and this forces hydraulic fluid from the master brake cylinder C through the hydraulic line 1 and out through the transverse openings in the tube 6 and into the fluid displacement space 8 in the bore 4 in the casing D. The O-ring 45 on the right-hand end of the valve body F, will contact with an adjacent shoulder 26 in the casing D, see also FIG. 3, to provide a liquidtight seal that will prevent any fluid from the tube 6 entering the passage 13 and passing through the check valve 15. Therefore the hydraulic fluid will flow from the fluid displacement space 8 and enter the lines 2 and actuate the brake cylinders B to apply the brakes. The reverse flow of hydraulic fluid will take place when the foot pedal 3 is released. No part of the device can impede the supply and return of fluid to or from the wheel brakes B.

We have already described how the combinations dials 38, see FIG. 5, can be rotated so as to provide the correct combination and permit the stop and release unit 41 to be depressed for moving the drive pin into the opening 24 and connecting the body lock assembly Q with the drive nut M, see also FIG. 5. This is done by the operator when he desires to move the valve body F from its inoperative position shown in FIG. 2, into its operative position shown in FIG. 3, in order to lock the brakes B of the vehicle wheels A, in braking position. The operator then rotates the lock assembly Q in a clockwise direction and this will rotate the drive nut M, in the same direction so that the drive nut M is moved longitudinally in the casing D, it will move the three rods P, in the same direction in order to move the valve body F to clamp against the O-rings 11 and 12 on the tubes 6 and 7, respectively. This seals off the displacement space 8 as illustrated in FIG. 3. The rods P, and the mechanism for moving them we refer to as a third means in the claims for moving the valve body F.

Now as the fluid under pressure from the vehicle master cylinder C flows through the pipe 1, due to the operator depressing the brake pedal 3, the fluid will flow past the nonreturn valve 15 in FIG. 3, and into the brake monitoring cylinder 14 and then will pass through the passage 18 in the valve body F and past the nonreturn valve 19, see FIG. 2. From here the fluid will flow through the line 2 to the brake cylinders B, and apply the brakes to the vehicle wheels A. The subsequent pressure build up reacts against the right-hand side of the valve body F, and against the brake monitoring piston K, for compressing the spring N, thus completing the master cylinder braking stroke.

The operator upon releasing the brake pedal 3, see FIG. 1, will permit the nonreturn valve 15 to close and retain the initially applied fluid pressure on the brake cylinders B, see also FIGS. 2 and 3. The volume of fluid in the brake monitoring bore 14 plus the yielding pressure of the spring N, on the piston K, will offset any contraction of fluid volume in the hydraulic line 2 and brake cylinders B, due to any temperature drop while the vehicle remains inoperative. The stop and release unit may be manually depressed and released for permitting the lock pin 37 and drive pin 35 to return to normal position and this will free the drive nut M from the drive pin so that a subsequent rotating of the body lock assembly Q will not rotate the nut M. The nut is held from accidental rotation by the pellet 31 that frictionally engages it. The combination dials 38 are rotated to cancel the correct combination of digits. The hydraulic fluid from the brake cylinders also reacts against the right hand end of the valve body F, for completing the sealing of the valve body against the O-rings 11 and 12.

When the operator wishes to release the brakes he dials the correct combination of the dials 38 and then rotates the body locking assembly Q until the arrow 42 registers with the arrow 43 for aligning the drive pin 35 with the opening 24 in the drive nut M, see FIGS. 2 and 5. The stop and release unit 41 is now depressed and will move the drive pin 35 into the opening 24. The body lock assembly is rotated counterclockwise and will rotate the drive nut M therewith to move the nut to the right in FIG. 3 and return the valve body F to an inoperative position as shown in FIG. 2. The valve body will move away from the O-rings 11 and 12 and uncover the lateral openings in the tubes 6 and 7 thus permitting a free flow of fluid from the brake cylinders B, back through the fluid displacement space 8 in the casing D, and back to the master cylinder C, shown in FIG. 1. The valve body F when in the inoperative position of FIG. 2, will seal off the brake monitoring bore 14 and prevent any fluid from entering it. Again it is the hydraulic fluid from the brake cylinders B that will return through the fluid displacement space 8 and react against the left-hand end of the valve body F to cause the complete sealing of the right-hand end of the valve body F against the O-ring 45, and prevent any fluid entering the brake monitoring cylindrical bore 14. The wheel brakes B, will now be released and the stop and release unit 41 may be depressed and released for removing the drive pin from the opening 24. The combination dials 38 may be rotated for cancelling the correct combination number.

Our device is designed to be used primarily in conjunction with the type of braking systems most commonly used in the automobiles and light trucks that use hydraulics as the means of transferring energy. As already stated, the device could be used on aircraft having a similar type of braking mechanism.

With the adoption of our unit and omitting the brake monitoring bore 14 and spring biased piston K, a lock could be incorporated in any double acting hydraulic system to prevent the unauthorized operation of the system. Such hydraulic systems are generally used in equipment and machinery such as construction equipment, fork lifts, elevators, hydraulic doors etc. Our device could be coupled into the main hydraulic line in such equipment.

The purpose of the electrical interlocks 30, shown in FIG. 2, is to afford simultaneous isolation of the starting and ignition circuits in the vehicle and bypassing the voltage regulator to eliminate this particular source of a fire hazard when the device is left in a locked position. The interlocks 30 could also be used for closing electrical circuits to audible alarms should the device be tampered with.

Our device is not intended to be used for parking a vehicle because the law requires a separate mechanism to be used for a vehicle emergency brake. Our device is coupled to the hydraulic braking system of the vehicle and is used for completely locking the hydraulic system when the vehicle is parked and the brakes are applied.

We claim:

1. In combination:

a. a casing having a first bore therein with a closed end;

b. a valve body slidably mounted in said bore;
c. a first and a second fluid conveying pipe communicating with the bore at the closed end thereof so that fluid can flow from the first pipe through the space in the bore between said valve body and the closed end before entering the second pipe when said valve body is in inoperative position;
d. said casing having a second bore of a smaller diameter than said first bore and communicating with the first bore, the other end of the second bore being closed; a shoulder is formed in the interior of the casing at the juncture where the two bores meet; said valve body having one end facing the closed end of said first bore and having its opposite end facing the closed end of said second bore;
e. said valve body having a first fluid passage therein and a check valve mounted in said passage for permitting fluid to flow in one direction and to enter said second bore when said valve body is in operative position;
f. a first means disposed between said first pipe and said first fluid passage in said valve body for placing the first pipe in communication with the space in said first bore formed between said valve body and said closed end when said valve body is in inoperative position; said means closing off communication with said space and directing the fluid into the valve body first fluid passage when said valve body is in operative position, whereby the fluid will enter said second bore;
g. said valve body having a second fluid passage therein and a check valve mounted in said second passage for permitting fluid to flow in only one direction from said second bore when said valve body is in operative position;
h. a second means disposed between said second pipe and said second fluid passage in said valve body for placing the second pipe in communication with said second passage when said valve body is in operative position, said second means closing off communication with said space in said first bore formed between said valve body and said closed end when said valve body is in operative position, and opening communication between said second pipe and said space when said valve body is in inoperative position; and
i. a third means for moving said valve body from operative to inoperative position for causing the end of the valve body disposed nearest to said second bore, to contact with said shoulder that lies at the juncture of said first bore with said second bore; and liquid sealing means positioned between said valve body and shoulder and contacted by both when said valve body is in inoperative position, said last-named sealing means also closing off any communication between said first and second passages in said valve body with said second bore, the pressure of fluid in the space provided in said first bore and bounded by said valve body and said closed cylinder end, acting against said valve body for aiding in keeping it pressed against said last-named liquid sealing means.

2. In combination
a. a casing having a first bore therein with a closed end;
b. a valve body slidably mounted in said bore;
c. a first and second fluid conveying pipe communicating with the bore at the closed end thereof so that fluid can flow from the first pipe through the space in the bore between said valve body and the closed end before entering the second pipe when said valve body is in inoperative position;
d. said casing having a second bore of a smaller diameter than said first bore and communicating with the first bore, the other end of the second bore being closed; a shoulder is formed in the interior of the casing at the juncture where the two bores meet; said valve body having one end facing the closed end of said first bore and having its opposite end facing the closed end of said second bore;
e. said valve body having a first fluid passage therein and a check valve mounted in said passage for permitting fluid to flow in one direction and to enter said second bore when said valve body is in operative position;
f. a first means disposed between said first pipe and said first fluid passage in said valve body for placing the first pipe in communication with the space in said first bore formed between said valve body and said closed end when said valve body is in inoperative position said means closing off communication with said space and directing the fluid into the valve body first fluid passage when said valve body is in operative position, whereby the fluid will enter said second bore;
g. said valve body having a second fluid passage therein and a check valve mounted in said second passage for permitting fluid to flow in only one direction from said second bore when said valve body is in operative position;
h. a second means disposed between said second pipe and said second fluid passage in said valve body for placing the second pipe in communication with said second passage when said valve body is in operative position, said second means closing off communication with said space in said first bore formed between said valve body and said closed end when said valve body is in operative position, and opening communication between said second pipe and said space when said valve body is in inoperative position; and
i. a third means for moving said valve body from inoperative to operative position for causing first and second means to prevent any return flow of fluid from said second pipe, back into said space in said first bore formed between said valve body and the closed end of the casing so that the fluid cannot enter said first pipe in any return flow of fluid, said check valve in said second passage preventing any return flow of fluid therein back into said second bore.

3. The combination as set forth in claim 2; and in which
a. a said first means includes a first tube communicating with said first pipe for receiving fluid therefrom and having a first sealing ring encircling said tube and contacting the closed end of said casing; and
b. said second means includes a second tube communicating with said second pipe and being adapted to receive fluid from the space in said first bore formed between said valve body and the closed end of said casing, said second tube having a second sealing ring encircling it and contacting with the closed end of said casing;
c. whereby the fluid in said second bore will exert a force against the adjacent end of said valve body for aiding in forcing it against said first and second sealing rings for closing off any fluid flow from either of said pipes into the space in said first bore formed between said valve body and the casing closed end.

4. The combination as set forth in claim 2: and in which
a. said third means for moving said valve body includes a combination lock which prevents any actuation of said third means until the correct combination for the lock is set.

5. The combination as set forth in claim 2: and in which
a. a spring-biased piston is slidably mounted in said second bore for exerting a yielding force on the fluid in the second bore for forcing it through said second passage in said valve body when the latter is in inoperative position for feeding fluid into said second pipe for compensating any possible loss of fluid from the second pipe.

6. The combination as set forth in claim 5: and in which
a. said second pipe communicates with at least one brake cylinder for a vehicle wheel; and
b. a master cylinder communicates with said first pipe.

7. The combination as set forth in claim 2: and in which
a. said third means for moving said valve body includes a plurality of longitudinally extending rods connected to said valve body at one end, these rods being slidably carried by said casing; and
b. a drive nut mounted on a threaded portion which is stationary with respect to said casing and having an annular outwardly extending flange that is slidably received in annular grooves provided in said rods;

c. whereby a rotation of said drive nut in one direction will move said rods for moving said valve body from inoperative to operative position and a reverse rotation of said drive nut will move said valve body from operative to inoperative position.

8. The combination as set forth in claim 7: and in which
a. said drive nut has at least one opening therein spaced away from the nut axis;
b. a member rotatably mounted in said casing and carrying a spring-biased drive pin that can be brought into registration with the opening in said drive nut when said member is rotated into a predetermined angular position; and
c. a combination lock controlled lock pin that is operatively connected to said drive pin so that when the correct combination is set, said lock pin may be actuated for moving said drive pin into the registering opening in said drive nut;
d. whereby the drive nut is connected to said rotatable member as a unit and a rotation of said member will move said valve body from inoperative to operative position and vice versa.

* * * * *